US012567265B2

(12) United States Patent
Ham et al.

(10) Patent No.: US 12,567,265 B2
(45) Date of Patent: Mar. 3, 2026

(54) VEHICLE, CONTROL METHOD THEREOF AND CAMERA MONITORING APPARATUS

(71) Applicants: HYUNDAI MOTOR COMPANY, Seoul (KR); KIA CORPORATION, Seoul (KR)

(72) Inventors: Jeonghun Ham, Goyang-si (KR); Yealim Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 542 days.

(21) Appl. No.: 18/081,060

(22) Filed: Dec. 14, 2022

(65) Prior Publication Data

US 2023/0230393 A1 Jul. 20, 2023

(30) Foreign Application Priority Data

Jan. 17, 2022 (KR) ........................ 10-2022-0006337

(51) Int. Cl.
B60W 50/00 (2006.01)
B60W 40/09 (2012.01)
(Continued)

(52) U.S. Cl.
CPC ........... G06V 20/588 (2022.01); B60W 40/09 (2013.01); B60W 50/14 (2013.01); G06V 20/58 (2022.01);
(Continued)

(58) Field of Classification Search
CPC ...... G06V 20/588; G06V 20/58; G06V 20/56; B60W 40/09; B60W 50/14; B60W 2050/146; B60W 2420/403; B60W 2420/408; B60W 2552/53; B60W 2050/0292; B60W 50/029; B60W 2554/4041; B60W 40/02; B60W 50/0205; B60W 2050/021; B60K 35/00;
(Continued)

(56) References Cited

U.S. PATENT DOCUMENTS 10,106,085 B2 * 10/2018 Kim ........................ G06V 20/56
2009/0033540 A1 * 2/2009 Breed .................. G05D 1/0278
701/472
(Continued)

FOREIGN PATENT DOCUMENTS

KR 10-2021-0076443 A 6/2021

*Primary Examiner* — Edward Park
*Assistant Examiner* — Alexander Joseph Vaughn
(74) *Attorney, Agent, or Firm* — Morgan, Lewis & Bockius LLP

(57) ABSTRACT

A vehicle includes: camera monitoring apparatus including a side-view camera having a field of view facing a rear lateral side of the vehicle and a side-view display configured to display a side-view image captured by the side-view camera; and a driver assistance system including a corner radar having a field of view facing a side of the vehicle, and configured to process radar data of the corner radar. The driver assistance system is configured to provide the camera monitoring apparatus with a virtual side-view image based on processing of the radar data of the corner radar when a failure of the side-view camera is detected. The camera monitoring apparatus is configured to display the virtual side-view image of the driver assistance system on the side-view display based on the failure of the side-view camera.

20 Claims, 11 Drawing Sheets

(51) Int. Cl.
    *B60W 50/14*        (2020.01)
    *G06V 20/56*        (2022.01)
    *G06V 20/58*        (2022.01)

(52) U.S. Cl.
    CPC . *B60W 2050/146* (2013.01); *B60W 2420/403*
        (2013.01); *B60W 2420/408* (2024.01); *B60W*
                             *2552/53* (2020.02)

(58) Field of Classification Search
    CPC ...... B60K 35/22; B60K 2360/21; B60R 1/00;
                                  B60Y 2306/15
    See application file for complete search history.

(56)                 References Cited

U.S. PATENT DOCUMENTS

| | | | |
|---|---|---|---|
| 2016/0031371 A1* | 2/2016 | Kimata | G06V 20/58 |
| | | | 348/148 |
| 2019/0135300 A1* | 5/2019 | Gonzalez Aguirre | G06N 20/00 |
| 2019/0188499 A1* | 6/2019 | Hummelshøj | G05D 1/0088 |
| 2020/0391757 A1* | 12/2020 | Kim | B60W 60/0055 |
| 2021/0284068 A1 | 9/2021 | Kong et al. | |
| 2022/0019396 A1* | 1/2022 | Choi | B60K 35/10 |
| 2022/0118908 A1* | 4/2022 | Lee | H04N 5/2628 |

* cited by examiner

52

1010 DISPLAY IMAGE RECEIVED FROM CAMERA

1020 IS FAILURE OF CAMERA OR TRANSMISSION ERROR OF IMAGE DETECTED?

NO

YES

1030 GENERATE VIRTUAL IMAGE

1040 DISPLAY VIRTUAL IMAGE

1050 IS FAILURE OF CAMERA OR TRANSMISSION ERROR OF IMAGE DETECTED?

YES

NO

1060 REQUEST DAS FOR DISCONTINUATION OF VIRTUAL IMAGE

1070 DISPLAY IMAGE RECEIVED FROM CAMERA

FIG. 11

VEHICLE, CONTROL METHOD THEREOF AND CAMERA MONITORING APPARATUS

CROSS-REFERENCE TO RELATED APPLICATION

This application is based on and claims the benefit of priority to Korean Patent Application No. 10-2022-0006337, filed on Jan. 17, 2022 in the Korean Intellectual Property Office, the disclosure of which is incorporated herein by reference.

TECHNICAL FIELD

The disclosure relates to a vehicle, a control method thereof and a camera monitoring apparatus, and more particularly, to a vehicle including a side-view camera and a rear-view camera, a control method thereof and a camera monitoring apparatus.

BACKGROUND

As the most common means of transportation in modern society, the number of people using vehicles is increasing. Although the development of vehicle technology has the advantage of making long-distance travel easier and living more conveniently, traffic congestion often occurs in places with high population density such as South Korea.

A lot of research on a vehicle equipped with an advanced driver assistance system (ADAS) that actively provides information about a vehicle state, a driver state and traffic environment has been recently carried out to reduce drivers' burden and improve convenience.

Recently, a camera monitoring system capable of obtaining information around a vehicle using a camera is provided. For example, a camera monitoring system may include a side-view camera replacing a side-view mirror or a rear-view camera replacing a rear-view mirror of a vehicle.

However, a camera monitoring system is incapable of providing a driver with information when an electronic device fails or malfunctions.

SUMMARY

An aspect of the disclosure provides a vehicle, a control method thereof and a camera monitoring apparatus that may secure driver's safety when a camera system or a communication system fails.

An aspect of the disclosure provides a vehicle, a control method thereof and a camera monitoring apparatus that may continuously provide a driver with information around the vehicle even when a camera system or a communication system fails.

Additional aspects of the disclosure will be set forth in part in the description which follows and, in part, will be obvious from the description, or may be learned by practice of the disclosure.

According to an aspect of the disclosure, there is provided a vehicle includes: a camera monitoring apparatus including a side-view camera having a field of view facing a rear lateral side of the vehicle and a side-view display configured to display a side-view image captured by the side-view camera; and a driver assistance system including a corner radar having a field of view facing a side of the vehicle, and configured to process radar data of the corner radar. The driver assistance system is configured to provide the camera monitoring apparatus with a virtual side-view image based on processing of the radar data of the corner radar based on a failure of the side-view camera being detected. The camera monitoring apparatus is configured to display the virtual side-view image of the driver assistance system on the side-view display based on the failure of the side-view camera being detected.

The driver assistance system further includes a controller configured to process the radar data of the corner radar. The controller is configured to identify a location of an object around the vehicle based on processing of the radar data of the corner radar.

The controller includes a three-dimensional (3D) model of an object, and is configured to render the 3D model into a two-dimensional (2D) image based on a location of the object.

The driver assistance system further includes a front camera having a field of view facing a front of the vehicle. The controller is configured to identify a lane marker in which the vehicle travels based on processing of image data of the front camera, and combine a 2D image of the lane marker and a 2D image of the object.

The camera monitoring apparatus is configured to identify the failure of the side-view camera, based on image data not being received from the side-view camera.

The vehicle further includes a cluster and a center fascia monitor. The camera monitoring apparatus is configured to display the side-view image on at least one of the cluster or the center fascia monitor based on a failure of the side-view display being identified.

The camera monitoring apparatus is configured to identify the failure of the side-view display, based on a periodic signal not being received from the side-view display.

The camera monitoring apparatus further includes a rear-view camera having a field of view facing a rear of the vehicle and a rear-view display configured to display a rear-view image captured by the rear-view camera. The driver assistance system is configured to provide the camera monitoring apparatus with a virtual rear-view image based on processing of the radar data of the corner radar when a failure of the rear-view camera is detected. The camera monitoring apparatus is configured to display the virtual rear-view image of the driver assistance system on the rear-view display based on the failure of the rear-view camera being detected.

According to an aspect of the disclosure, there is provided a control method of a vehicle, the control method including: displaying, on a side-view display, a side-view image captured by a side-view camera having a field of view facing a rear lateral side of the vehicle, generating a virtual side-view image based on processing of radar data of a corner radar having a field of view facing a side of the vehicle when a failure of the side-view camera is detected, and displaying the virtual side-view image on the side-view display.

According to an aspect of the disclosure, there is provided a camera monitoring apparatus of a vehicle, the camera monitoring apparatus including: a side-view camera having a field of view facing a rear lateral side of the vehicle; a side-view display provided inside the vehicle; a corner radar having a field of view facing a side of the vehicle; and a controller configured to display, on the side-view display, a side-view image captured by the side-view camera. When a failure of the side-view camera is detected, the controller is configured to generate a virtual side-view image based on processing of radar data of the corner radar based on a failure of the side-view camera is detected, and display the virtual side-view image on the side-view display.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 11 illustrates a configuration of a vehicle according to an embodiment.

DETAILED DESCRIPTION

Figure 1:
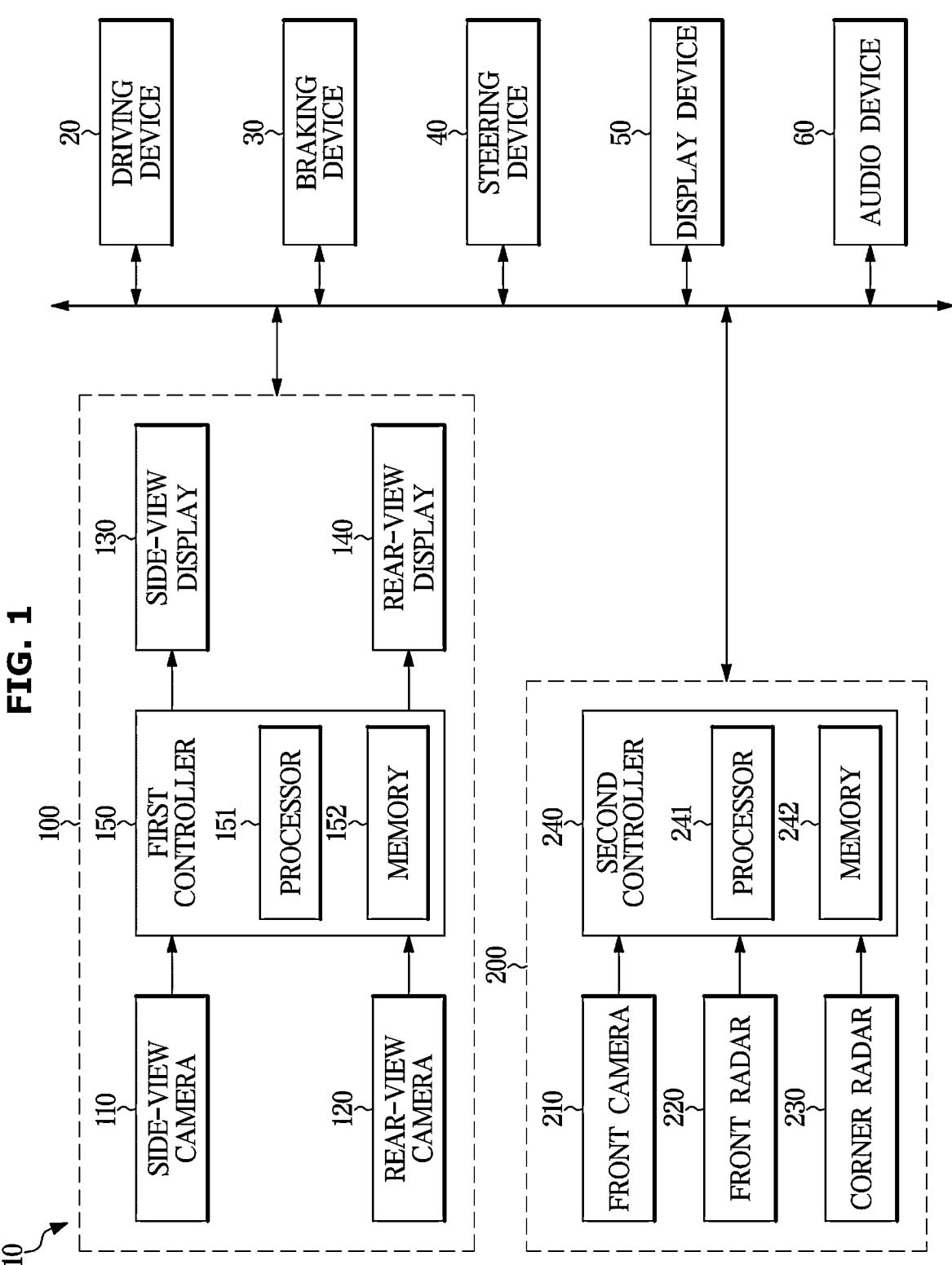
FIG. 1 illustrates a configuration of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes connection via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc., may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 2:
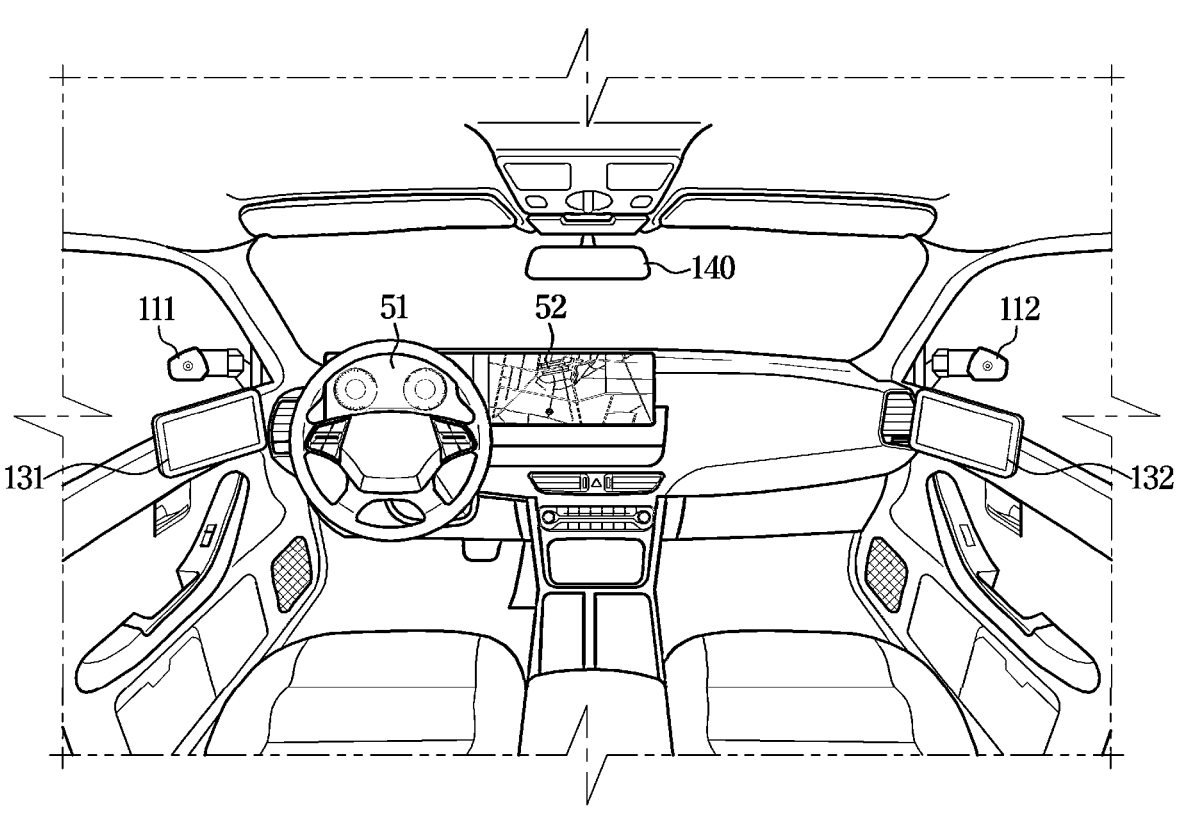
FIG. 2 illustrates an inside of a vehicle according to an embodiment.
Figure 3:
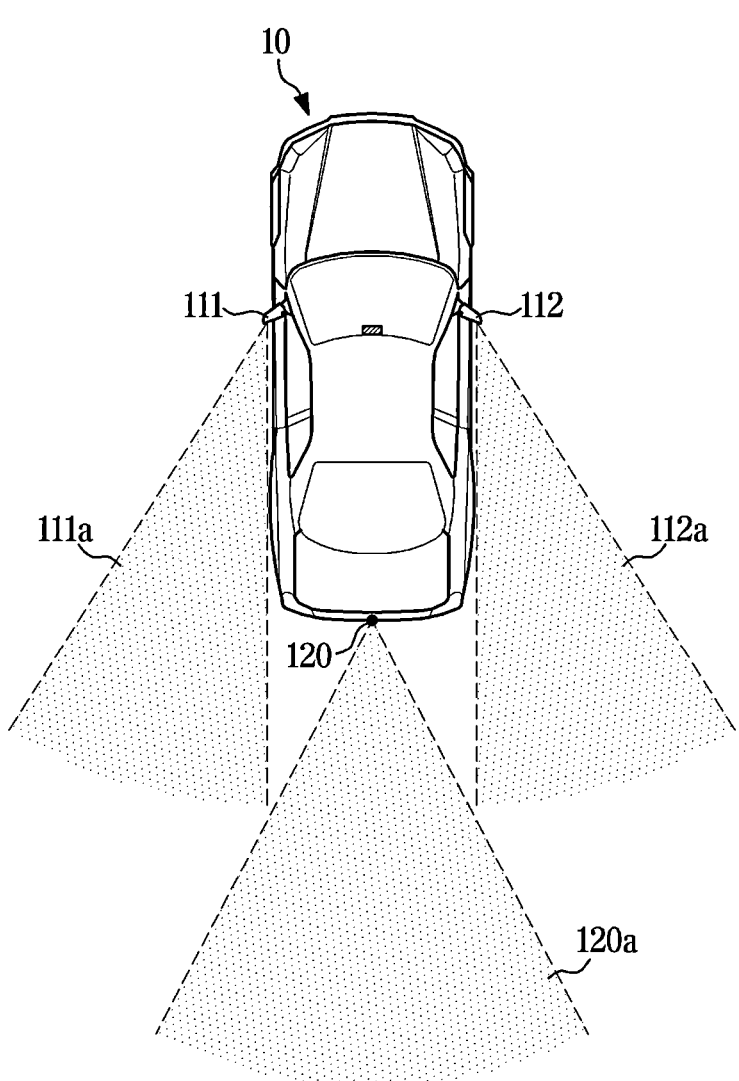
FIG. 3 illustrates fields of view of a camera included in a camera monitoring apparatus of a vehicle according to an embodiment.
Figure 4:
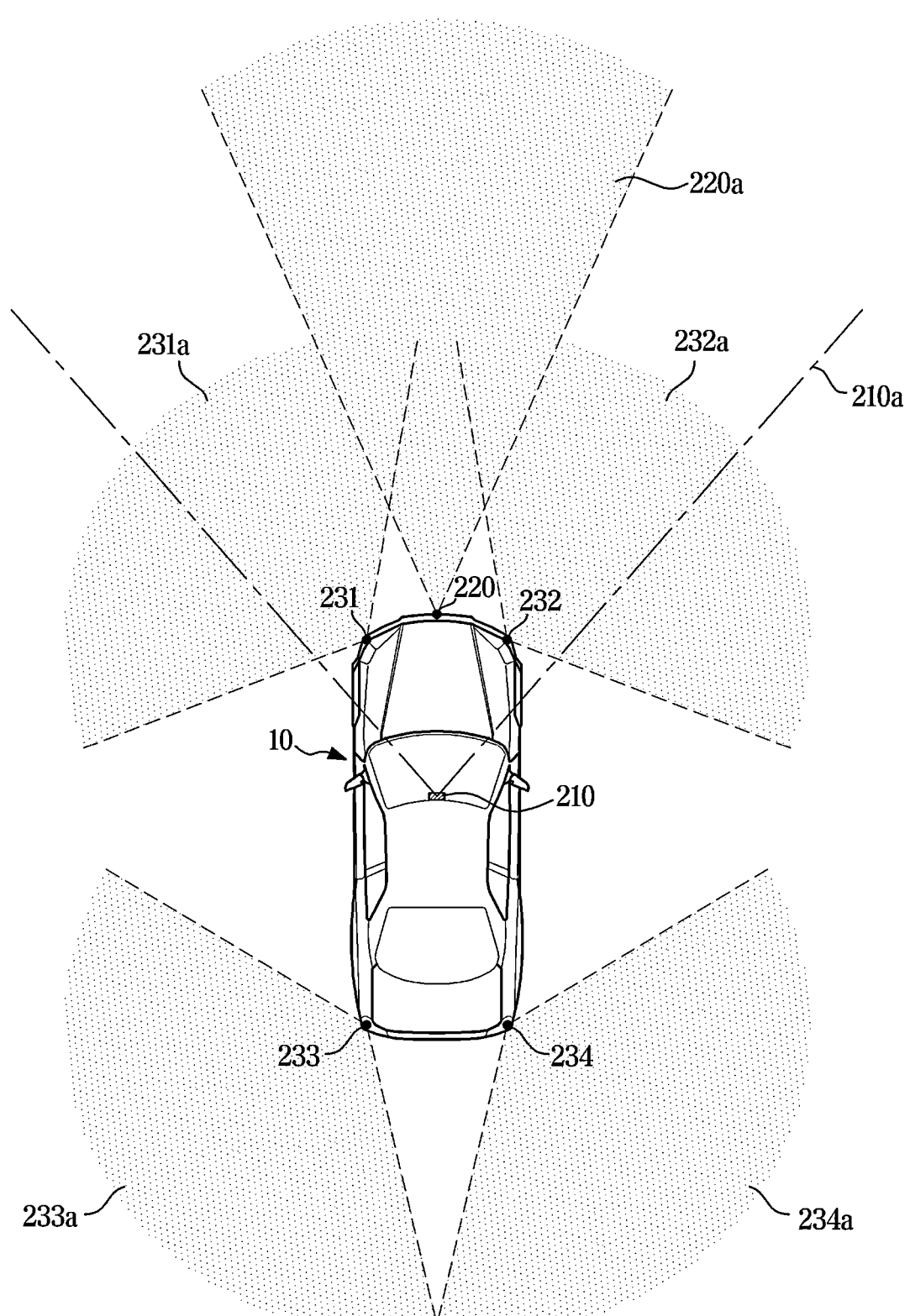
FIG. 4 illustrates fields of view of a camera and a radar included in a driver assistance system of a vehicle according to an embodiment.

FIG. 1 illustrates a configuration of a vehicle according to an embodiment. FIG. 2 illustrates an inside of a vehicle according to an embodiment. FIG. 3 illustrates fields of view of a camera included in a camera monitoring apparatus of a vehicle according to an embodiment. FIG. 4 illustrates fields of view of a camera and a radar included in a driver assistance system of a vehicle according to an embodiment.

Referring to FIGS. 1, 2, 3 and 4, a vehicle 10 may include a driving device 20, a braking device 30, a steering device 40, a display device 50, an audio device 60, a camera monitoring apparatus 100 and a driver assistance system (DAS) 200.

The driving device 20 may drive the vehicle 10 to move the vehicle 10 and, for example, include an engine, an engine management system (EMS), a transmission, and a transmission control unit (TCU). The engine may generate power for driving the vehicle 10. The EMS may control the engine in response to a driver's acceleration intention through an accelerator pedal or a request from the DAS 200. The transmission may decelerate and transmit the power generated by the engine to vehicle wheels. The TCU may control the transmission in response to a driver's shift command through a shift lever and/or a request from the DAS 200.

The braking device 30 may stop the vehicle 10 and, for example, include a brake caliper and an electronic brake control module (EBCM). The brake caliper may decelerate or stop the vehicle 10 using friction with a brake disc. The EBCM may control the brake caliper in response to a driver's braking intention through a brake pedal and/or a request from the DAS 200. For example, the EBCM may receive a deceleration request including a deceleration from the DAS 200, and control the brake caliper electrically or hydraulically to decelerate the vehicle 10 based on the requested deceleration.

The steering device 40 may include an electronic power steering control module (EPS). The steering device 40 may change a driving direction of the vehicle 10. The EPS may assist operations of the steering device 40 so that a driver may easily manipulate a steering wheel according to a driver's steering intention. The EPS may also control the steering device in response to a request from the DAS 200. For example, the EPS may receive a steering request including a steering torque from the DAS 200, and control the steering device to steer the vehicle 10 based on the requested steering torque.

The display device 50 may include a cluster 51, a center fascia monitor 52, etc., and provide a driver with various information and entertainment through images and sounds. For example, the display device 50 may provide the driver with travel information of the vehicle 10, a warning message, and the like.

The audio device 60 may include a plurality of speakers, and provide the driver with various information and entertainment through sounds. For example, the audio device 60 may provide the driver with travel information of the vehicle 10, a warning message, and the like.

The camera monitoring apparatus 100 may communicate with the driving device 20, the braking device 30, the steering device 40, the display device 50, the audio device 60, and the DAS 200 via a vehicle communication network.

The camera monitoring apparatus 100 may include a side-view camera 110, a rear-view camera 120, a side-view display 130, a rear-view display 140, and a first controller 150. A configuration of the camera monitoring apparatus 100 is not limited to that illustrated in FIG. 1, and a portion of the constituent components illustrated in FIG. 1 may be omitted or other constituent components may be added to the camera monitoring apparatus 100.

The camera monitoring apparatus 100 may display an image, captured by the side-view camera 110, on the side-view display 130, and also display an image, captured by the rear-view camera 120, on the rear-view display 140.

As shown in FIG. 2, the side-view camera 110 may include a first side-view camera 111 and a second side-view camera 112.

As shown in FIGS. 2 and 3, the first side-view camera 111 may be mounted on a left exterior of the vehicle 10 to have a field of view (FOV) 111*a* facing a rear left side of the vehicle 10.

The first side-view camera 111 may include at least one lens and image sensor. The image sensor may include a plurality of photodiodes converting light into an electrical signal, and the plurality of photodiodes may be arranged in a two-dimensional (2D) matrix.

The first side-view camera 111 may be electrically connected to the first controller 150. For example, the first side-view camera 111 may be connected to the first controller 150 via a vehicle communication network, a hard wire, or a printed circuit board (PCB).

The first side-view camera 111 may capture the rear left side of the vehicle 10 and provide captured first side-view image data to the first controller 150.

As shown in FIGS. 2 and 3, the second side-view camera 112 may be mounted on a right exterior of the vehicle 10 to have a field of view 112*a* facing a rear right side of the vehicle 10. The second side-view camera 112 may capture the rear right side of the vehicle 10 and provide captured second side-view image data to the first controller 150. A configuration and connection of the second side-view camera 112 may be the same as the first side-view camera 111.

The rear-view camera 120 may be mounted on a rear side of the vehicle 10 to have a field of view facing a rear of the vehicle 10. The rear-view camera 120 may capture the rear of the vehicle 10 and provide captured rear-view image data to the first controller 150. A configuration and connection of the rear-view camera 120 may be the same as the first side-view camera 111 and the second side-view camera 112.

As shown in FIG. 2, the side-view display 130 may include a first side-view display 131 and a second side-view display 132.

The first side-view display 131 may be mounted on a left inside of the vehicle 10 so that a driver sitting in a driver's seat may see the first side-view display 131.

The first side-view display 131 may include a display panel (e.g., a liquid crystal display (LCD) panel or a light emitting diode (LED) panel). The display panel may include a plurality of pixels forming an image, and convert image data into a 2D visual image.

The first side-view display 131 may be electrically connected to the first controller 150 via a vehicle communication network, a hard wire, or a PCB.

The first side-view display 131 may receive the first side-view image data of the vehicle 10 from the first controller 150, and display a first side-view image.

The second side-view display 132 may be mounted on a right inside of the vehicle 10 so that the driver sitting in the driver's seat may see the second side-view display 132. The second side-view display 132 may receive the second side-view image data of the vehicle 10 from the first controller 150, and display a second side-view image. A configuration and connection of the second side-view display 132 may be the same as the first side-view display 131.

The rear-view display 140 may be mounted in a center of an inside of the vehicle 10 to allow the driver sitting in the driver's seat to see the rear-view display 140. The rear-view display 140 may receive the rear-view image data of the vehicle 10 from the first controller 150 and display a rear-view image. A configuration and connection of the rear-view display 140 may be the same as the first side-view display 131 and the second side-view display 132.

The first controller 150 may be electrically connected to the side-view camera 110, the rear-view camera 120, the side-view display 130, and/or the rear-view display 140. Also, the first controller 150 may be connected to the driving device 20, the braking device 30, the steering device 40, the display device 50, the audio device 60, and/or the DAS 200 via a vehicle communication network, etc.

The first controller 150 may be variously referred to as an electronic control unit (ECU), and the like. The first controller 150 may include a processor 151, a memory 152 and a communication module 1. For example, the first controller 150 may include one or more processors or one or more memories. The first controller 150 according to an exemplary embodiment of the present disclosure may be a hardware device implemented by various electronic circuits (e.g., computer, microprocessor, CPU, ASIC, circuitry, logic circuits, etc.). The first controller 150 may be implemented by a non-transitory memory storing, e.g., a program(s), software instructions reproducing algorithms, etc., which, when executed, performs various functions of the processor 151, and the communication module 1, and a processor 151 configured to execute the program(s), software instructions reproducing algorithms, etc. The processor 151 may embody one or more processor(s). The processor 151, the memory 152 and the communication module 1 may be implemented as separate semiconductor devices or as a single integrated semiconductor device.

The processor 151 may process each of the side-view image data and/or the rear-view image data, and transmit the processed side-view image data and/or the processed rear-view image data to the displays 130 and 140, respectively.

The processor 151 may include a single chip (or a core) or a plurality of chips (or cores). For example, the processor 151 may include an image processor for processing the image data, and/or a micro control unit (MCU) for outputting a control signal for controlling operations of the camera monitoring apparatus 100.

The memory 152 may store a program and/or data for processing the image data and outputting the control signal.

The memory 152 may include a volatile memory such as a static random access memory (S-RAM) and dynamic random access memory (D-RAM), and a non-volatile memory such as a read only memory (ROM), an erasable programmable read only memory (EPROM), and the like. The memory 152 may include a single memory device or a plurality of memory devices.

The communication module 1 may communicate with other electronic components of the vehicle 10 via a vehicle communication network. The communication module 1 may transmit and receive a communication signal with the driving device 20, the braking device 30, the steering device 40, the display device 50, the audio device 60 and/or the DAS 200.

The communication module 1 may communicate with other electronic components of the vehicle 10 using various communication protocols. For example, the communication module 1 may transmit and receive a communication signal with the other electronic components of the vehicle 10 using a controller area network (CAN).

For example, the communication module 1 may include a transmission circuit for transmitting a communication signal and a reception circuit for receiving the communication signal.

As described above, the first controller 150 may receive the image data from the cameras 110 and 120, process the received image data, and transmit the processed image data to the displays 130 and 140.

The first controller 150 may identify at least one of a failure of the cameras 110 and 120, a damage of a transmission line of the image data, or a failure of the displays 130 and 140.

For instance, when image data is not received from at least one of the cameras 110 and 120, the first controller 150 may identify the failure of at least one of the cameras 110 and 120, or the damage of the transmission line of the image data. Also, when a format of the image data received from at least one of the cameras 110 and 120 does not conform to a predetermined format, the first controller 150 may identify the failure of at least one of the cameras 110 and 120, or the damage of the transmission line of the image data.

When at least one of the failure of the cameras 110 and 120 or the damage of the transmission line of the image data is identified, the first controller 150 may request the DAS 200 for a virtual image to replace at least one of the first side-view image, the second side-view image, or the rear-view image.

In response to the request from the camera monitoring apparatus 100, the DAS 200 may provide the virtual image to the camera monitoring apparatus 100 via a vehicle communication network. The first controller 150 may display the virtual image received from the DAS 200 on at least one of the displays 130 and 140.

Also, the first controller 150 may periodically receive a signal for monitoring from the displays 130 and 140, and when a signal is not received from at least one of the displays 130 and 140 within a predetermined period, identify a failure of at least one of the displays 130 and 140.

When the failure of at least one of the displays 130 and 140 is identified, the first controller 150 may transmit, to the display device 50 of the vehicle 10, at least one of the first side-view image, the second side-view image, or the rear-view image, together with a request for displaying an image.

As described above, the camera monitoring apparatus 100 may identify the failure of the cameras 110 and 120 or the failure of the displays 130 and 140, and cooperate with the DAS 200 or the display device 50, based on the identification of the failure of the cameras 110 and 120 or the failure of the displays 130 and 140.

The DAS 200 may communicate with the driving device 20, the braking device 30, the steering device 40, the display device 50, the audio device 60, and/or the camera monitoring apparatus 100 via a vehicle communication network.

The DAS 200 may collect data related to the vehicle 10 (e.g., a position, movement, etc., of another vehicle or a pedestrian), and output a control signal for controlling the driving device 20, the braking device 30, the steering device 40, the display device 50, and/or the audio device 60 based on the collected data.

The DAS 200 may generate a virtual side-view image and/or a virtual rear-view image of the vehicle 10 based on a request from the camera monitoring apparatus 100.

The DAS 200 may include a front camera 210, a front radar 220, a corner radar 230 and/or a second controller 240. However, a configuration of the DAS 200 is not limited to that illustrated in FIG. 1, and a portion of the constituent components illustrated in FIG. 1 may be omitted or other constituent components may be added to the DAS 200.

As shown in FIG. 4, the front camera 210 may be mounted on the front of the vehicle 10 to have a field of view 210a facing the front of the vehicle 10.

The front camera 210 may capture the front of the vehicle 10. The front camera 210 may obtain front image data of the vehicle 10. The image data may include information about another vehicle, a pedestrian, a lane, and the like, in front of the vehicle 10.

The front camera 210 may include at least one lens and image sensor. The image sensor may include a plurality of photodiodes converting light into an electrical signal, and the plurality of photodiodes may be arranged in a 2D matrix.

The front camera 210 may be electrically connected to the second controller 240. For example, the front camera 210 may be connected to the second controller 240 via a vehicle communication network, a hard wire, or a PCB.

As shown in FIG. 4, the front radar 220 may be mounted on the front of the vehicle 10 to have a field of sensing 220a facing the front of the vehicle 10.

For example, the front radar 220 may include a transmission antenna transmitting radio waves toward the front of the vehicle 10 and a receiving antenna receiving radio waves reflected by an object.

The front radar 220 may transmit radio waves toward the front of the vehicle 10 and receive radio waves reflected from an object. The front radar 220 may obtain radar data from the received radio wave. The radar data may include location information (e.g., distance information) of objects located in front of the vehicle 10.

The front radar 220 may be connected to the second controller 240 via a vehicle communication network, a hard wire, or a PCB, and transmit the radar data to the second controller 240.

The corner radar 230 may include a first corner radar 231, a second corner radar 232, a third corner radar 233 and/or a fourth corner radar 234.

As shown in FIG. 4, the first corner radar 231 may be mounted on a front left corner of the vehicle 10 to have a field of view 231a facing the front left side of the vehicle 10. The second corner radar 232 may be mounted on a front right corner of the vehicle 10 to have a field of view 232a facing the front right side of the vehicle 10. The third corner radar 233 may be mounted on a rear left corner of the vehicle 10 to have a field of view 233a facing the rear left side of the vehicle 10. The fourth corner radar 234 may be mounted on a rear right corner of the vehicle 10 to have a field of view 234a facing the rear right side of the vehicle 10.

The first, second, third and fourth corner radars 231, 232, 233 and 234 may transmit radio waves toward the front left, front right, rear left and rear right sides of the vehicle 10, respectively, and receive radio waves reflected from objects. The corner radars 231, 232, 233 and 234 may obtain radar data from each of the received radio waves. The radar data may include location information (e.g., distance information) of objects located in the front left, front right, rear left and rear right sides of the vehicle 10, respectively.

Each of the corner radars 231, 232, 233 and 234 may be connected to the second controller 240 via a vehicle communication network, a hard wire, or a PCB, and transmit the radar data to the second controller 240.

The second controller 240 may be electrically connected to the front camera 210, the front radar 220, and/or the corner radar 230. Also, the second controller 240 may be connected to the driving device 20, the braking device 30, the steering device 40, the display device 50, the audio device 60, and/or the camera monitoring apparatus 100 via a vehicle communication network, etc.

The second controller 240 may be variously referred to as an electronic control unit (ECU), and the like, and include a processor 241, a memory 242 and a communication module 2. The second controller 240 according to an exemplary embodiment of the present disclosure may be a hardware device implemented by various electronic circuits (e.g., computer, microprocessor, CPU, ASIC, circuitry, logic circuits, etc.). The second controller 240 may be implemented by a non-transitory memory storing, e.g., a program(s), software instructions reproducing algorithms, etc., which, when executed, provide the functionality of the processor 241, and the communication module 2.

The processor 241 may process image data and/or radar data, and output a control signal for controlling a movement of the vehicle 10 or proving a warning to a driver based on processing of the data.

The processor 241 may include a single chip (or a core) or a plurality of chips (or cores).

For example, the processor 241 may include an image processor for processing the image data, and detect a front object of the vehicle 10 based on processing of the image data. For instance, the processor 241 may generate a track that represents an object using image processing, and classify the track. The processor 241 may identify whether the track is another vehicle, a pedestrian, or an animal.

For example, the processor 241 may include a signal processor for processing the radar data, and the signal processor may generate a track that represents an object by clustering reflection points of the received ultrasonic wave. The processor 241 may acquire a distance of the track based on received radio waves.

For example, the processor 241 may include a micro control unit (MCU) outputting a control signal for controlling a movement of the vehicle 10 or proving a warning to a driver based on processing of the image data and/or the radar data. The processor 241 may transmit the control signal for controlling a movement of the vehicle 10 or proving a warning to a driver to the driving device 20, the braking device 30, the steering device 40, the display device 50 and/or the audio device 60 via a vehicle communication network, etc.

The memory 242 may store a program and/or data for processing the image data and/or the radar data and outputting the control signal.

The memory 242 may include a volatile memory such as a static random access memory (S-RAM) and dynamic random access memory (D-RAM), and a non-volatile memory such as a read only memory (ROM), an erasable programmable read only memory (EPROM), and the like. The memory 242 may include a single memory device or a plurality of memory devices.

The communication module 2 may communicate with other electronic components of the vehicle 10 via a vehicle communication network. The communication module 2 may transmit and receive a communication signal with the driving device 20, the braking device 30, the steering device 40, the display device 50, the audio device 60 and/or the camera monitoring apparatus 100.

The communication module 2 may communicate with other electronic components of the vehicle 10 using various communication protocols. For example, the communication module 2 may transmit and receive a communication signal with the other electronic components of the vehicle 10 using a controller area network (CAN). The processor 151 and the communication module 2 may be implemented as separate semiconductor devices or as a single integrated semiconductor device.

As described above, the second controller 240 may process the image data received from the front camera 210 and/or the radar data received from the radars 220 and 230, and output a control signal for controlling a movement of the vehicle 10 or proving a warning to a driver based on processing of the data.

In response to a request for a virtual image from the camera monitoring apparatus 100, the second controller 240 may generate a first virtual side-view image, a second virtual side-view image and/or a virtual rear-view image of the vehicle 10.

For example, the second controller 240 may identify whether an object exists on the rear left, rear right and/or rear sides of the vehicle 10 based on the radar data of the corner radar 230, and determine a location of the object located in the rear left, rear right and/or rear sides of the vehicle 10.

The second controller 240 may generate the first virtual side-view image, the second virtual side-view image and/or the virtual rear-view image of the vehicle 10 based on the locations of the objects located in the rear left, rear right and/or rear sides of the vehicle 10.

The second controller 240 may transmit the first virtual side-view image, the second virtual side-view image and/or the virtual rear-view image to the camera monitoring apparatus 100 via a vehicle communication network.

As such, the DAS 200 may cooperate with the camera monitoring apparatus 100 based on the request from the camera monitoring apparatus 100.

Figure 5:
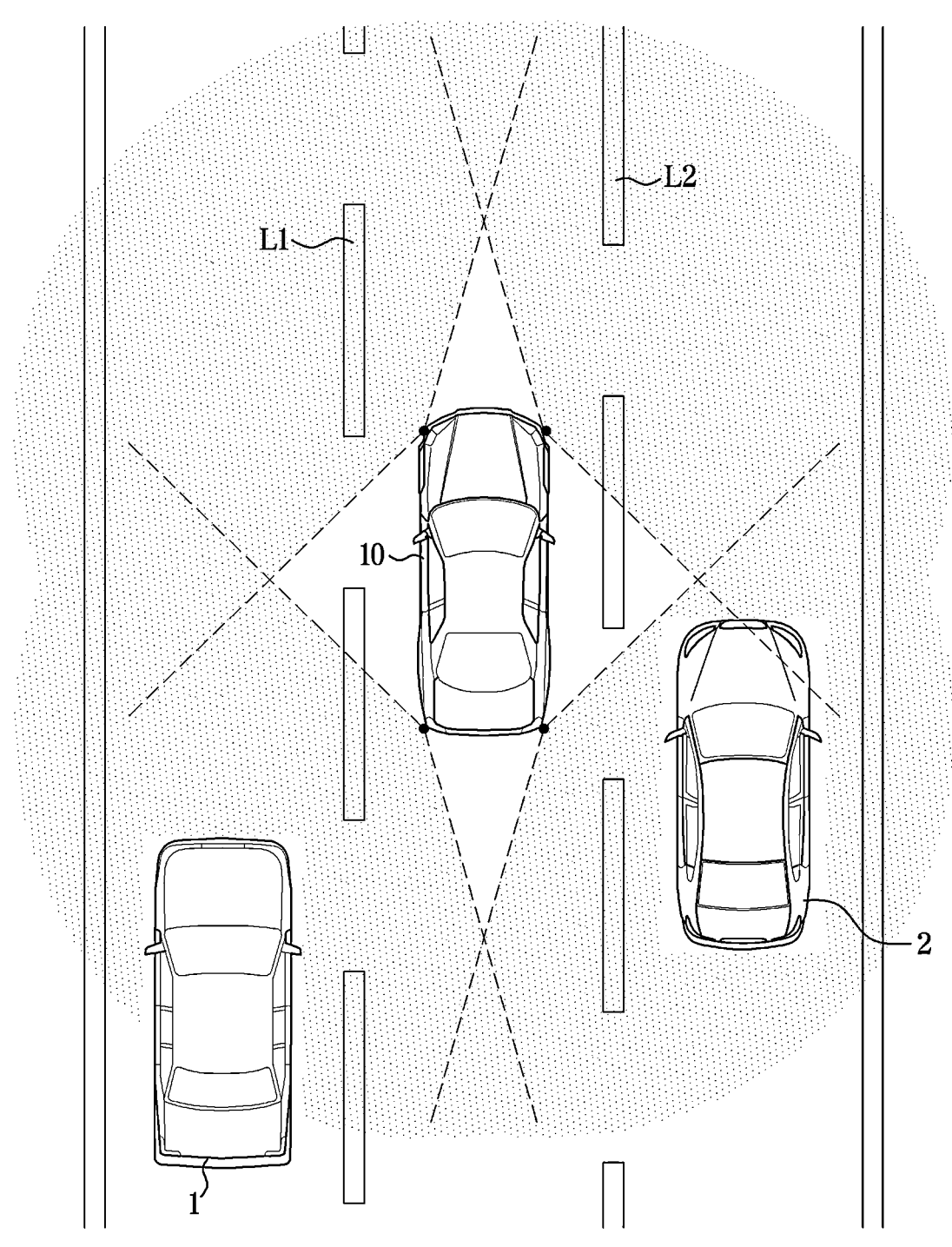
FIG. 5 illustrates an example of generating a virtual side-view image by a driver assistance system of a vehicle according to an embodiment.
Figure 6:
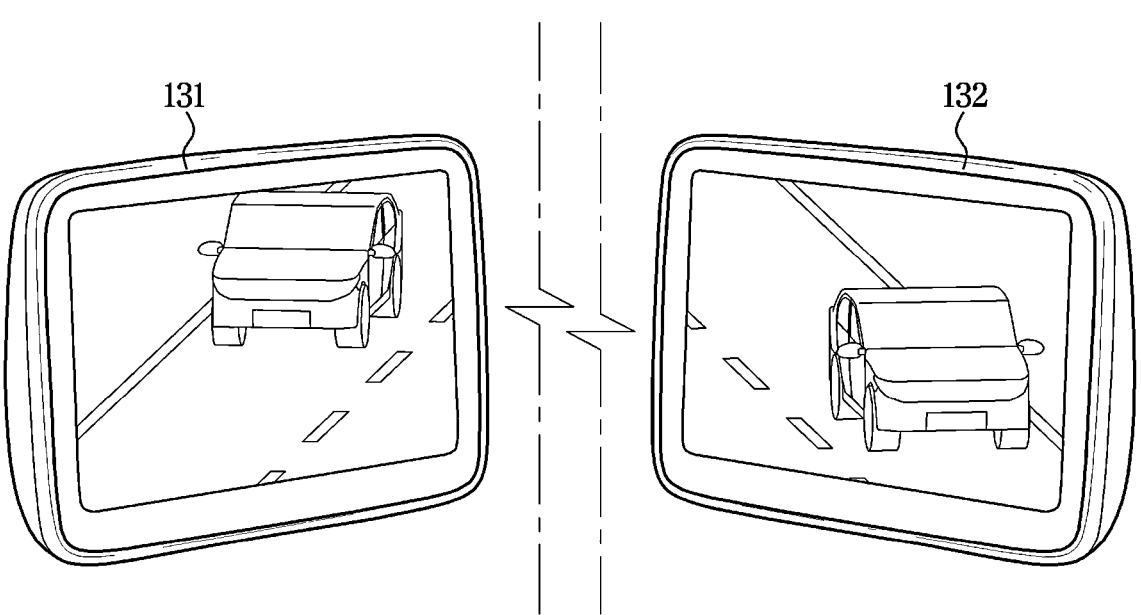
FIG. 6 illustrates an example of displaying a virtual side-view image by a camera monitoring apparatus of a vehicle according to an embodiment.

FIG. 5 illustrates an example of generating a virtual side-view image by a DAS of a vehicle according to an embodiment. FIG. 6 illustrates an example of displaying a virtual side-view image by a camera monitoring apparatus of a vehicle according to an embodiment.

The camera monitoring apparatus 100 may identify a failure of the side-view camera 110 and/or the rear-view camera 120. Also, the camera monitoring apparatus 100 may identify a transmission error of image data. The camera monitoring apparatus 100 may request the DAS 200 for a virtual image, based on the failure of the cameras 110 and 120 or the transmission error of image data.

The DAS 200 may provide the camera monitoring apparatus 100 with a virtual side-view image and/or a virtual rear-view image in response to the request from the camera monitoring apparatus 100.

The second controller 240 of the DAS 200 may obtain image data of the front camera 210, and identify a lane marker distinguishing a lane in which the vehicle 10 travels based on the image data. For example, as shown in FIG. 5, the second controller 240 may identify whether lane markers L1 and L2 are broken lines, solid lines, or double lines (broken line+solid line).

The second controller 240 may obtain radar data of the corner radar 230, and identify an object located in the rear left, rear right and/or rear sides of the vehicle 10 based on the radar data. For example, as shown in FIG. 5, the second controller 240 may identify a first object 1 and a second object 2.

Also, the second controller 240 may identify relative positions of the identified objects. The second controller 240 may identify a distance between the vehicle 10 and the identified object and a direction to the identified object from the vehicle 10.

For example, as shown in FIG. 5, the second controller 240 may identify a relative position of the first object 1 and a relative position of the second object 2.

The second controller 240 may render lane markers based on a type of an identified lane marker and a photographing direction of the side-view camera 110.

A three-dimensional (3D) model of vehicle may be stored in the memory 242 of the second controller 240 in advance. The second controller 240 may render the 3D model of the vehicle into a 2D image depending on the relative positions of the objects.

The second controller 240 may generate a virtual image by superimposing or combining the rendered lane image and the 2D image of object.

As shown in FIG. 6, for example, the second controller 240 may generate a first virtual side-view image including a rendered left lane image, identified on the left side of the vehicle 10, and a rendered image of a first object 1 identified on the rear left side of the vehicle 10. Also, the second controller 240 may generate a second virtual side-view image including a rendered right lane image, identified on the right side of the vehicle 10, and a rendered image of a second object 2 identified on the rear right side of the vehicle 10.

The DAS 200 may transmit the generated virtual image to the camera monitoring apparatus 100 via a vehicle communication network.

The camera monitoring apparatus 100 may receive the virtual side-view image from the DAS 200 and display the virtual side-view image on the side-view display 130. For example, as shown in FIG. 6, the camera monitoring apparatus 100 may display the first virtual side-view image including the rendered image of the first object 1 on the first side-view display 131, and display the second virtual side-view image including the rendered image of the second object 2 on the second side-view display 132.

Accordingly, the vehicle 10 may provide a driver with the side-view image and/or the rear-view image even in the event of failure of the side-view camera 110 and/or the rear-view camera 120 or the transmission error of image data. That is, the vehicle 10 may provide redundancy of the camera monitoring apparatus 100.

Figure 7:
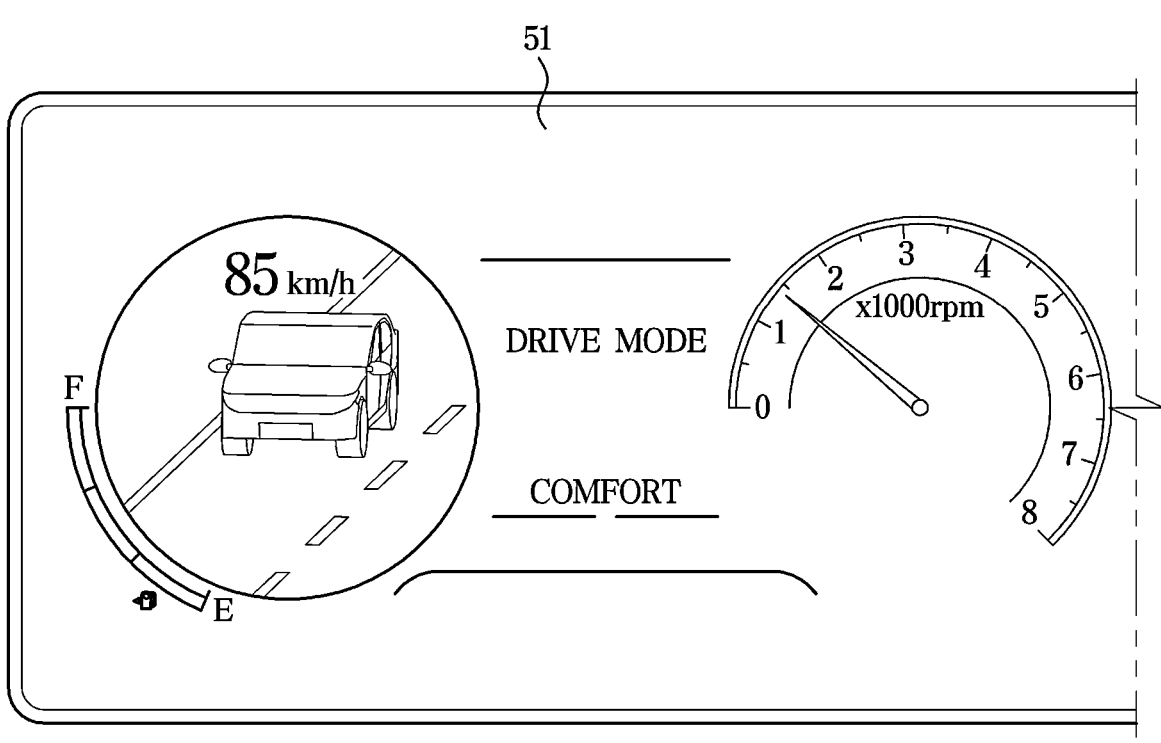
FIGS. 7 and 8 illustrate examples of displaying a side-view image by a display device of a vehicle according to an embodiment.
Figure 8:
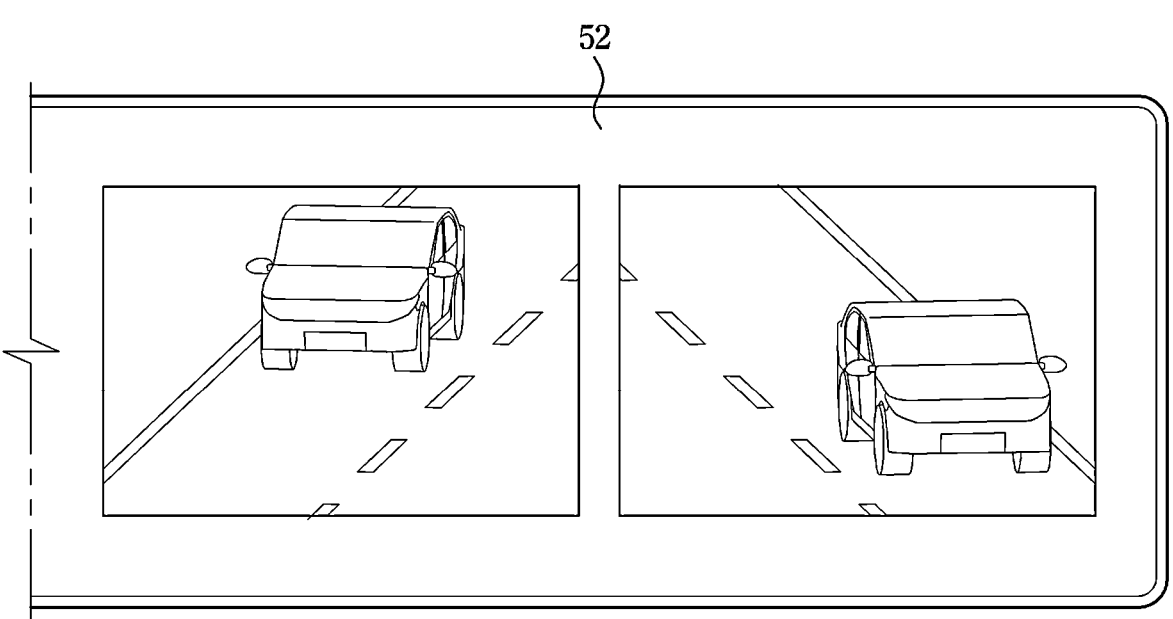

FIGS. 7 and 8 illustrate examples of displaying a side-view image by a display device of a vehicle according to an embodiment.

The camera monitoring apparatus 100 may identify a failure of the side-view display 130 and/or the rear-view display 140. The camera monitoring apparatus 100 may request the display device 50 of the vehicle 10 for displaying an image based on the identification of the failure of the displays 130 and 140, and transmit a side-view image and/or a rear-view image to the display device 50.

For example, the camera monitoring apparatus 100 may transmit the side-view image and/or the rear-view image to the cluster 51. As shown in FIG. 7, the cluster 51 may display the side-view image and/or the rear-view image received from the camera monitoring apparatus 100.

For example, the camera monitoring apparatus 100 may transmit the side-view image and/or the rear-view image to the center fascia monitor 52. As shown in FIG. 8, the center fascia monitor 52 may display the side-view image and/or the rear-view image received from the camera monitoring apparatus 100.

Figure 9:
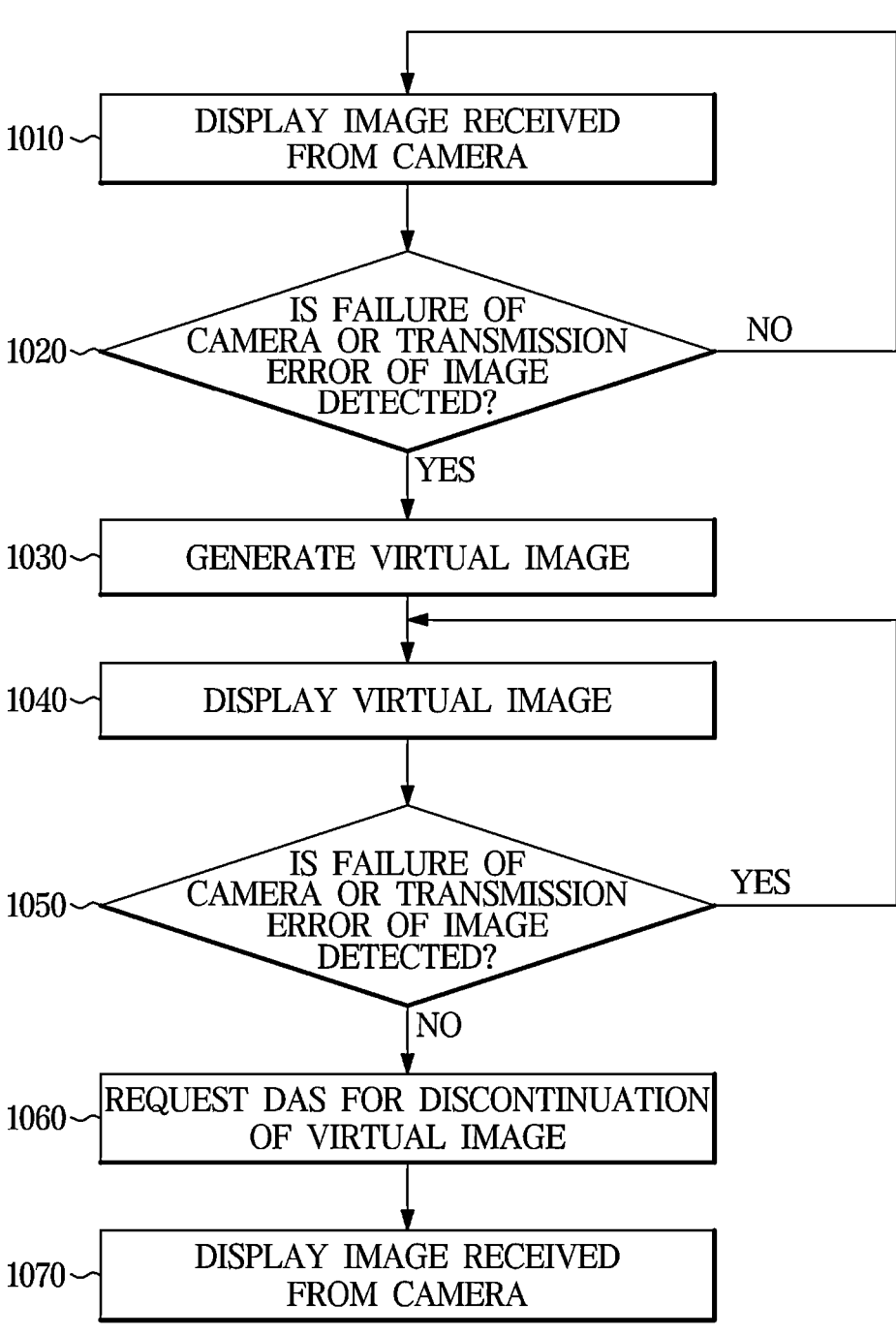
FIG. 9 illustrates operations to respond to an error in data transmission or a failure of a camera of a vehicle according to an embodiment.

FIG. 9 illustrates operations to respond to an error in data transmission or a failure of a camera of a vehicle according to an embodiment.

Referring to FIG. 9, the vehicle 10 may display an image received from the cameras 110 and 120 on the displays 130 and 140 (1010).

The camera monitoring apparatus 100 may display images, received from the side-view camera 110 and/or the rear-view camera 120, on the side-view display 130 and/or the rear-view display 140, respectively.

The vehicle 10 may identify whether a failure of the cameras 110 and 120 or a transmission error of image is detected (1020).

The camera monitoring apparatus 100 may identify the failure of the cameras 110 and 120 or the transmission error of image, based on whether image data is received from the cameras 110 and 120.

When the failure of the cameras 110 and 120 or the transmission error of image is not detected (No in operation 1020), the vehicle 10 may continuously display the image received from the cameras 110 and 120 on the displays 130 and 140.

When the failure of the cameras 110 and 120 or the transmission error of image is detected (Yes in operation 1020), the vehicle 10 may generate a virtual image (1030).

The camera monitoring apparatus 100 may request the DAS 200 for the virtual image. The DAS 200 may provide a virtual side-view image and/or a virtual rear-view image to the camera monitoring apparatus 100, based on an output of the front camera 210 and an output of the corner radar 230.

The vehicle 10 may display the virtual image on the displays 130 and 140 (1040).

The camera monitoring apparatus 100 may display the virtual side-view image and/or the virtual rear-view image, received from the DAS 200, on the displays 130 and 140.

The vehicle 10 may determine whether the failure of the cameras 110 and 120 or the transmission error of image continues (1050).

When the failure of the cameras 110 and 120 or the transmission error of image continues (Yes in operation 1050), the vehicle 10 may continuously display the virtual image on the displays 130 and 140.

When the failure of the cameras 110 and 120 or the transmission error of image no longer continues (No in operation 1050), the vehicle 10 may display the image received from the cameras 110 and 120 on the displays 130 and 140 (1070).

Figure 10:
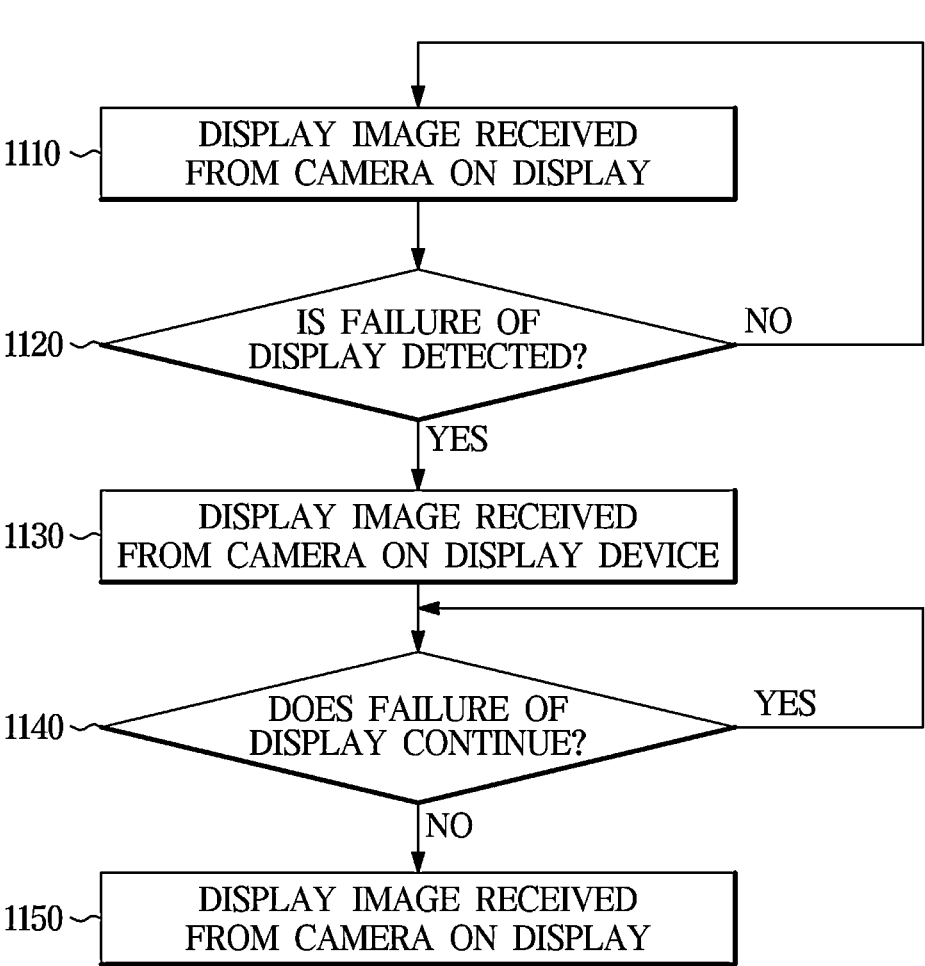
FIG. 10 illustrates operations to respond to a failure of a display of a vehicle according to an embodiment.

FIG. 10 illustrates operations to respond to a failure of a display of a vehicle according to an embodiment.

Referring to FIG. 10, the vehicle 10 may display an image received from the cameras 110 and 120 on the displays 130 and 140 (1110).

The operation 1110 may be the same as the operation 1010 illustrated in FIG. 9.

The vehicle 10 may identify whether a failure of the displays 130 and 140 is detected (1120).

The camera monitoring apparatus 100 may identify whether the displays 130 and 140 fail, based on whether a periodic signal is received from the displays 130 and 140.

When the failure of the displays 130 and 140 is not detected (No in operation 1120), the vehicle 10 may continuously display the image received from the cameras 110 and 120 on the displays 130 and 140.

When the failure of the displays 130 and 140 is detected (Yes in operation 1120), the vehicle 10 may display the image received from the cameras 110 and 120 on the display device 50 (1130).

The camera monitoring apparatus 100 may request the cluster 51 and/or the center fascia monitor 52 for displaying an image. Also, the camera monitoring apparatus 100 may transmit the image received from the cameras 110 and 120 to the cluster 51 and/or the center fascia monitor 52.

The vehicle 10 may determine whether the failure of the displays 130 and 140 continues (1140).

When the failure of the displays 130 and 140 continues (Yes in operation 1140), the vehicle 10 may continuously display the image received from the cameras 110 and 120 on the display device 50.

When failure of the displays 130 and 140 no longer continues (No in operation 1140), the vehicle 10 may display the image received from the cameras 110 and 120 on the displays 130 and 140 (1150).

Figure 11:
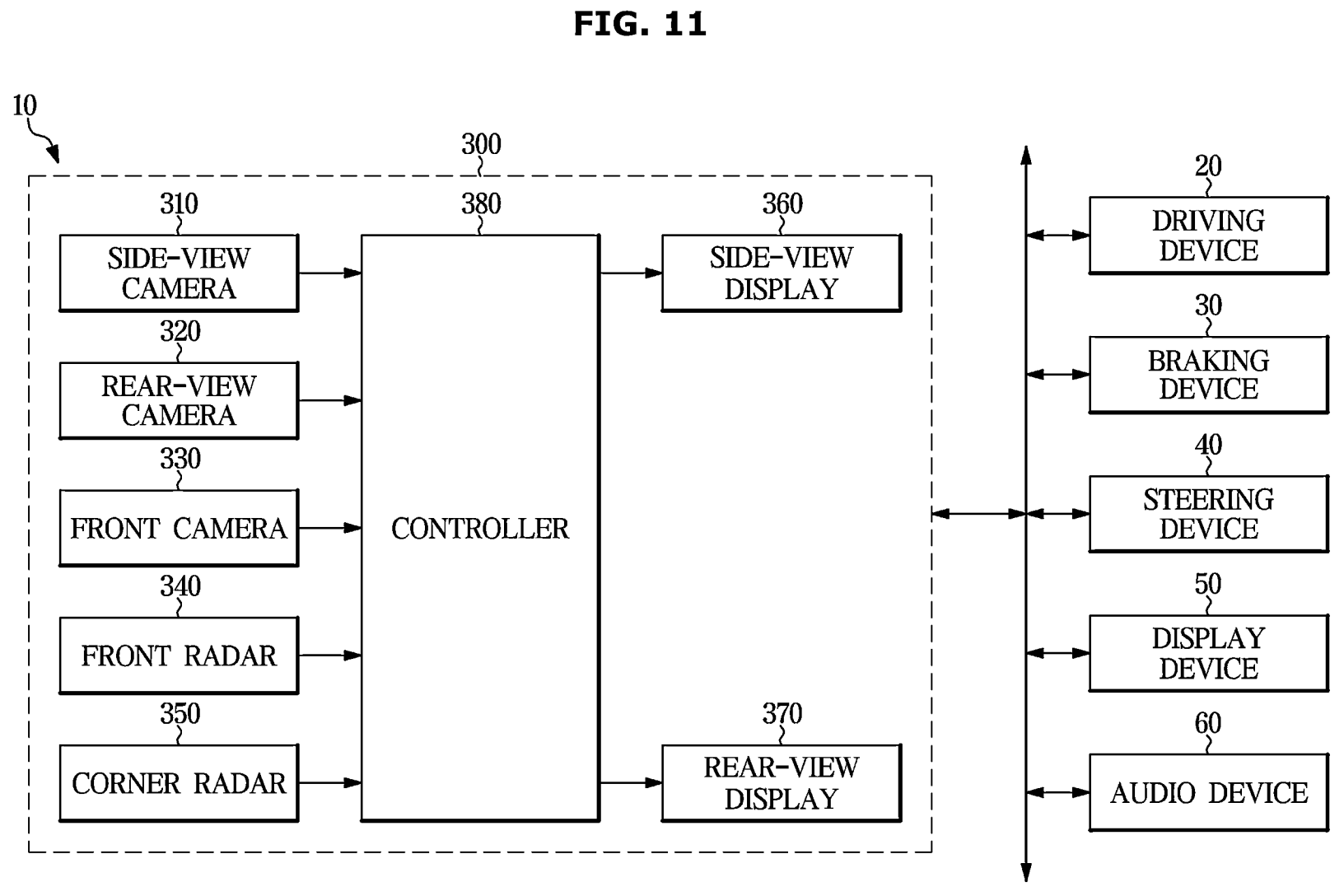

FIG. 11 illustrates a configuration of a vehicle according to an embodiment.

The vehicle 10 may include the driving device 20, the braking device 30, the steering device 40, the display device 50, the audio device 60, and a camera monitoring apparatus 300.

Here, the driving device 20, the braking device 30, the steering device 40, the display device 50, and the audio device 60 may be the same as the driving device, the braking device, the steering device, the display device and the audio device illustrated in FIG. 1.

The camera monitoring apparatus 300 may include a side-view camera 310, a rear-view camera 320, a front camera 330, a front radar 340, a corner radar 350, a side-view display 360, a rear-view display 370, and a controller 380.

Here, the side-view camera 310, the rear-view camera 320, the front camera 330, the front radar 340, the corner radar 350, the side-view display 360, and the rear-view display 370 may be the same as the side-view camera 110, the rear-view camera 120, the front camera 210, the front radar 220, the corner radar 230, the side-view display 130, and the rear-view display 140 illustrated in FIG. 1.

The controller 380 may display an image received from the side-view camera 310 and/or the rear-view camera 320 on the side-view display 360 and/or the rear-view display 370, respectively.

When a failure of the cameras 310 and 320 or a transmission error of image data is detected, the controller 380 may generate a virtual image based on image data of the front camera 330 and/or radar data of the corner radar 350. Also, the controller 380 may display the virtual image on the side-view display 360 and/or the rear-view display 370.

As described above, the camera monitoring apparatus 300 may be integrated with a DAS. The camera monitoring apparatus 300 may include an image processor, and generate a virtual side-view image and/or a virtual rear-view image based on processing of image data by the image processor.

Accordingly, the vehicle 10 may provide redundancy of the camera monitoring apparatus 300.

As is apparent from the above, according to the embodiments of the disclosure, the vehicle, the control method thereof and the camera monitoring apparatus can secure driver's safety when a camera system or a communication system fails.

According to the embodiments of the disclosure, the vehicle, the control method thereof and the camera monitoring apparatus can continuously provide a driver with information around the vehicle even when a camera system or a communication system fails.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
   a camera monitoring apparatus comprising a side-view camera having a field of view facing a rear lateral side of the vehicle, and a side-view display configured to display a side-view image captured by the side-view camera; and
   a driver assistance system comprising a corner radar having a field of view facing a side of the vehicle, and configured to process radar data of the corner radar,
   wherein the driver assistance system is configured to provide the camera monitoring apparatus with a virtual side-view image based on processing of the radar data of the corner radar when a failure of the side-view camera is detected, and
   the camera monitoring apparatus is configured to display the virtual side-view image of the driver assistance system on the side-view display based on the failure of the side-view camera,
   wherein the camera monitoring apparatus is configured to determine whether the failure of the side-view camera continues, and display the virtual side-view image on the side-view display when the failure of the side-view camera continues, and display the side-view image on the side-view display when the failure of the side-view camera no longer continue.

2. The vehicle of claim 1, wherein the driver assistance system further comprises a controller configured to process the radar data of the corner radar, and
   the controller is configured to identify a location of an object around the vehicle based on processing of the radar data of the corner radar.

3. The vehicle of claim 2, wherein the controller includes a three-dimensional (3D) model of the object, and
   the controller is configured to render the 3D model into a two-dimensional (2D) image based on the location of the object.

4. The vehicle of claim 3, wherein the driver assistance system further comprises a front camera having a field of view facing a front of the vehicle,
   wherein the controller is configured to identify a lane marker in which the vehicle travels based on processing of image data of the front camera, and
   combine a 2D image of the lane marker and a 2D image of the object.

5. The vehicle of claim 1, wherein the camera monitoring apparatus is configured to identify the failure of the side-view camera, based on failure of reception of image data from the side-view camera or reception of image data from the side-view camera which does not conform to a predetermined format.

6. The vehicle of claim 1, further comprising a cluster and a center fascia monitor, wherein the camera monitoring apparatus is configured to display the side-view image on at least one of the cluster and the center fascia monitor based on when a failure of the side-view display is identified.

7. The vehicle of claim 6, wherein the camera monitoring apparatus is configured to identify the failure of the side-view display, based on failure of reception of a periodic signal from the side-view display.

8. The vehicle of claim 1, wherein the camera monitoring apparatus further comprises a rear-view camera having a field of view facing a rear of the vehicle and a rear-view display configured to display a rear-view image captured by the rear-view camera, the driver assistance system is configured to provide the camera monitoring apparatus with a virtual rear-view image based on processing of the radar data of the corner radar when a failure of the rear-view camera is detected, and the camera monitoring apparatus is configured to display the virtual rear-view image of the driver assistance system on the rear-view display based on the failure of the rear-view camera.

9. A control method of a vehicle, the control method comprising:

displaying, on a side-view display, a side-view image captured by a side-view camera having a field of view facing a rear lateral side of the vehicle;

generating a virtual side-view image based on processing of radar data of a corner radar having a field of view facing a side of the vehicle based on detection of a failure of the side-view camera; and displaying the virtual side-view image on the side-view display, wherein the control method further comprises determining whether the failure of the side-view camera continues, displaying the virtual side-view image on the side-view display when the failure of the side-view camera continues, and displaying the side-view image on the side-view display when the failure of the side-view camera no longer continues.

10. The control method of claim 9, wherein the generating of the virtual side-view image comprises identifying a location of an object around the vehicle based on processing of the radar data of the corner radar.

11. The control method of claim 10, the generating of the virtual side-view image further comprises rendering a pre-stored 3D model of the object into a 2D image based on the location of the object.

12. The control method of claim 10, wherein the generating of the virtual side-view image further comprises identifying a lane marker in which the vehicle travels based on processing of image data of a front camera having a field of view facing a front of the vehicle, and combining a 2D image of the lane marker and a 2D image of the object.

13. The control method of claim 9, further comprising:

identifying the failure of the side-view camera, based on failure of reception of image data from the side-view camera or reception of image data from the side-view camera which does not conform to a predetermined format.

14. The control method of claim 9, further comprising:

displaying the side-view image on at least one of a cluster or a center fascia monitor of the vehicle based on a failure of the side-view display being identified.

15. The control method of claim 14, further comprising:

identifying the failure of the side-view display, based on failure of reception of a periodic signal from the side-view display.

16. The control method of claim 9, further comprising:

displaying, on a rear-view display, a rear-view image captured by a rear-view camera having a field of view facing a rear of the vehicle;

generating a virtual rear-view image based on processing of the radar data of the corner radar when a failure of the rear-view camera is detected; and displaying the virtual rear-view image on the rear-view display based on the failure of the rear-view camera.

17. A camera monitoring apparatus of a vehicle, the camera monitoring apparatus comprising:

a side-view camera having a field of view facing a rear lateral side of the vehicle;

a side-view display provided inside the vehicle;

a corner radar having a field of view facing a side of the vehicle; and a controller configured to display, on the side-view display, a side-view image captured by the side-view camera, wherein the controller is configured to generate a virtual side-view image based on processing of radar data of the corner radar based on a failure of the side-view camera is detected, and display the virtual side-view image on the side-view display, wherein the controller is configured to determine whether the failure of the side-view camera continues, and display the virtual side-view image on the side-view display when the failure of the side-view camera continues, and display the side-view image on the side-view display when the failure of the side-view camera no longer continues.

18. The camera monitoring apparatus of claim 17, wherein the controller is configured to identify a location of an object around the vehicle based on processing of the radar data of the corner radar.

19. The camera monitoring apparatus of claim 18, wherein the controller includes a 3D model of the object, and the controller is configured to render the 3D model into a 2D image based on the location of the object.

20. The camera monitoring apparatus of claim 17, wherein the controller is configured to display the side-view image on at least one of a cluster or a center fascia monitor of the vehicle when a failure of the side-view display is identified.

* * * * *